Figure 1:
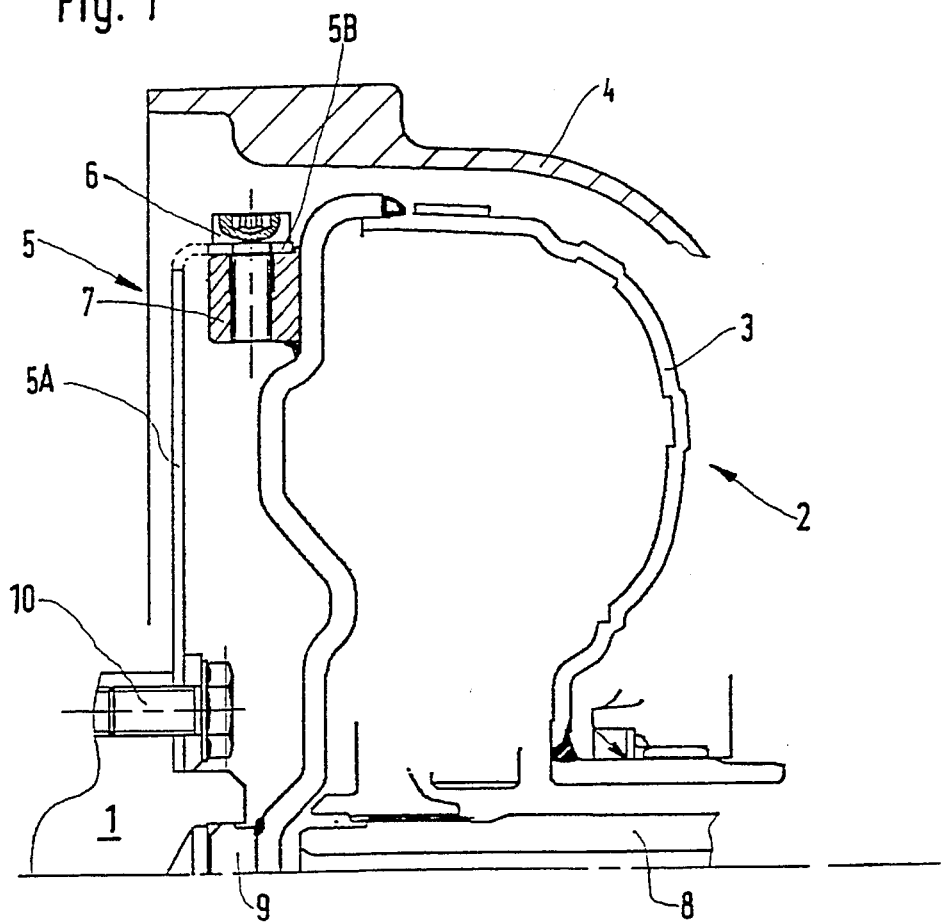

United States Patent [19]
Gärtner

[11] Patent Number: 5,616,002
[45] Date of Patent: Apr. 1, 1997

[54] DEVICE FOR THE TRANSMISSION OF MOMENT FROM A DRIVE UNIT TO A TRANSMISSION USING A HYDRODYNAMIC CONVERTER

[75] Inventor: Lutz Gärtner, Langenargen, Germany

[73] Assignee: ZF Friedrichshafen AG, Friedrichshafen, Germany

[21] Appl. No.: 557,198

[22] PCT Filed: Sep. 28, 1994

[86] PCT No.: PCT/EP94/03241

§ 371 Date: Apr. 23, 1996

§ 102(e) Date: Apr. 23, 1996

[87] PCT Pub. No.: WO95/09994

PCT Pub. Date: Apr. 13, 1995

[30] Foreign Application Priority Data

Oct. 2, 1993 [DE] Germany .............. 43 33 644.2

[51] Int. Cl.[6] .................................... F04D 29/38
[52] U.S. Cl. ............................................. 416/180
[58] Field of Search ................... 416/180, 197 C

[56] References Cited

U.S. PATENT DOCUMENTS

| 3,101,672 | 8/1963 | Peras | 416/180 |
|---|---|---|---|
| 3,316,622 | 5/1967 | Jandasek | 410/180 |
| 3,545,883 | 12/1970 | Iijima | 416/180 |
| 3,713,353 | 1/1973 | Scheiter . | |
| 3,824,038 | 7/1974 | Tokunaga | 416/180 |
| 3,839,864 | 10/1974 | Ahlen . | |
| 4,665,693 | 5/1987 | Misu et al. | 416/180 |
| 5,113,654 | 5/1992 | Sahashi | 416/180 |
| 5,522,220 | 6/1996 | Locker | 416/180 |

FOREIGN PATENT DOCUMENTS

| 1061353 | 3/1967 | United Kingdom . |
| 1580561 | 12/1980 | United Kingdom . |
| 2052689 | 1/1981 | United Kingdom . |

Primary Examiner—John T. Kwon
Attorney, Agent, or Firm—Davis and Bujold

[57] ABSTRACT

A device for transmitting moment from a drive unit to a transmission using a hydrodynamic converter (2). The output shaft (1) of the drive unit and the hydrodynamic converter (2) are connected via a dog (5) and radially arranged components (6).

1 Claim, 2 Drawing Sheets

DEVICE FOR THE TRANSMISSION OF MOMENT FROM A DRIVE UNIT TO A TRANSMISSION USING A HYDRODYNAMIC CONVERTER

The invention concerns a device for transmission of moment from a drive unit to a transmission using hydrodynamic converters according to the preamble of the first claim.

A hydrodynamic converter has been disclosed in J. Looman's book "Zahnradgetriebe" (gear drive), volume 26, 1970, page 124, FIG. 5.45. The hydrodynamic converter consists of a converter housing and an impeller, a turbine wheel and a stator free wheel integrated therein. The impeller is non-rotatably connected with the converter housing. As known per se, the energy is transmitted from the impeller to the turbine wheel via a fluid medium such as oil. The turbine wheel converts the flow movement to a rotary movement and drives a transmission input shaft. The moment is transmitted from a diagrammatically shown shaft to the converter housing via a dog. The dog is axially screwed with the shaft in the area thereof. The dog is also screwed in an axial direction with an intake which, in turn, is firmly connected with the converter housing. The converter housing or the impeller thus rotates at the same speed as the diagrammatically shown shaft. In the area of the central axle, the converter housing has a pivot on the side facing the shaft. Said pivot is positively locked in a recess of the shaft. Thereby, the radial position of the hydrodynamic converter relative to the shaft is fixed. The axial position of the hydrodynamic converter relative to the shaft is fixed by the screw connection shaft/dog and dog/intake.

The disadvantage of this design is that when installing a transmission, for example, in a motor vehicle, a large free space must exist between the engine block and the transmission housing, since the screw connection dog/converter housing is accessible only in an axial direction.

The problem to be solved by the invention is to secure a simple solution for installation while, at the same time, reducing the axial length.

According to the invention said problem is solved by the fact that the converter housing and the dog are fixed reciprocally in a radial direction by means of several connecting components. Connecting components, according to the invention, are to be understood, for example as: screws, rivets, bolts and pins. The solution according to the invention offers the advantage that as result of the radial accessibility of the fastening elements, the free space between the engine block and the hydrodynamic converter can be made shorter. This is specially advantageous when the space for the drive unit/transmission unit is limited like in motor vehicles with a rear engine or a central engine.

In another embodiment of the invention it is proposed that the connecting components be situated equidistantly on the periphery dog/converter housing and that the number of connecting components be even. The advantage obtained hereby is that changes of shape of the dog produced by internal structural stresses be compensated as result of oppositely situated connecting components.

In another embodiment of the invention, it is proposed that the dog consists of two legs, said legs forming a right angle, and the dog having, in the area of the angle, a recess. The advantage obtained hereby is that the dog be flexible in the radial direction. It is hereby ensured that the radial position of the hydrodynamic converter relative to a shaft is determined, like in the prior art, only by the pivot. As result of the flexible configuration of the dog, the radial fastening elements do not determine the radial position of the hydrodynamic converter.

Another solution according to the invention is that the converter housing and the dog be connected by a spline. In development of this, it is proposed that the spline extends in an axial direction. This solution offers the advantage that the drive unit/transmission connection can be plugged in. Thereby the time spent for installing and removing is shortened.

Figure 2:
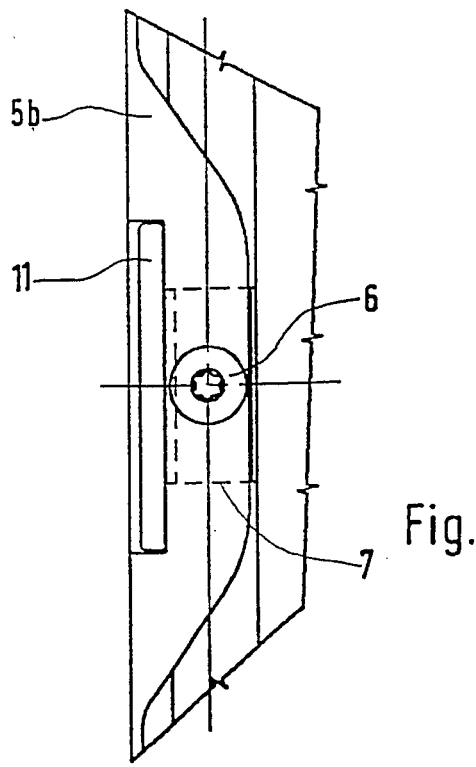
Figure 3:
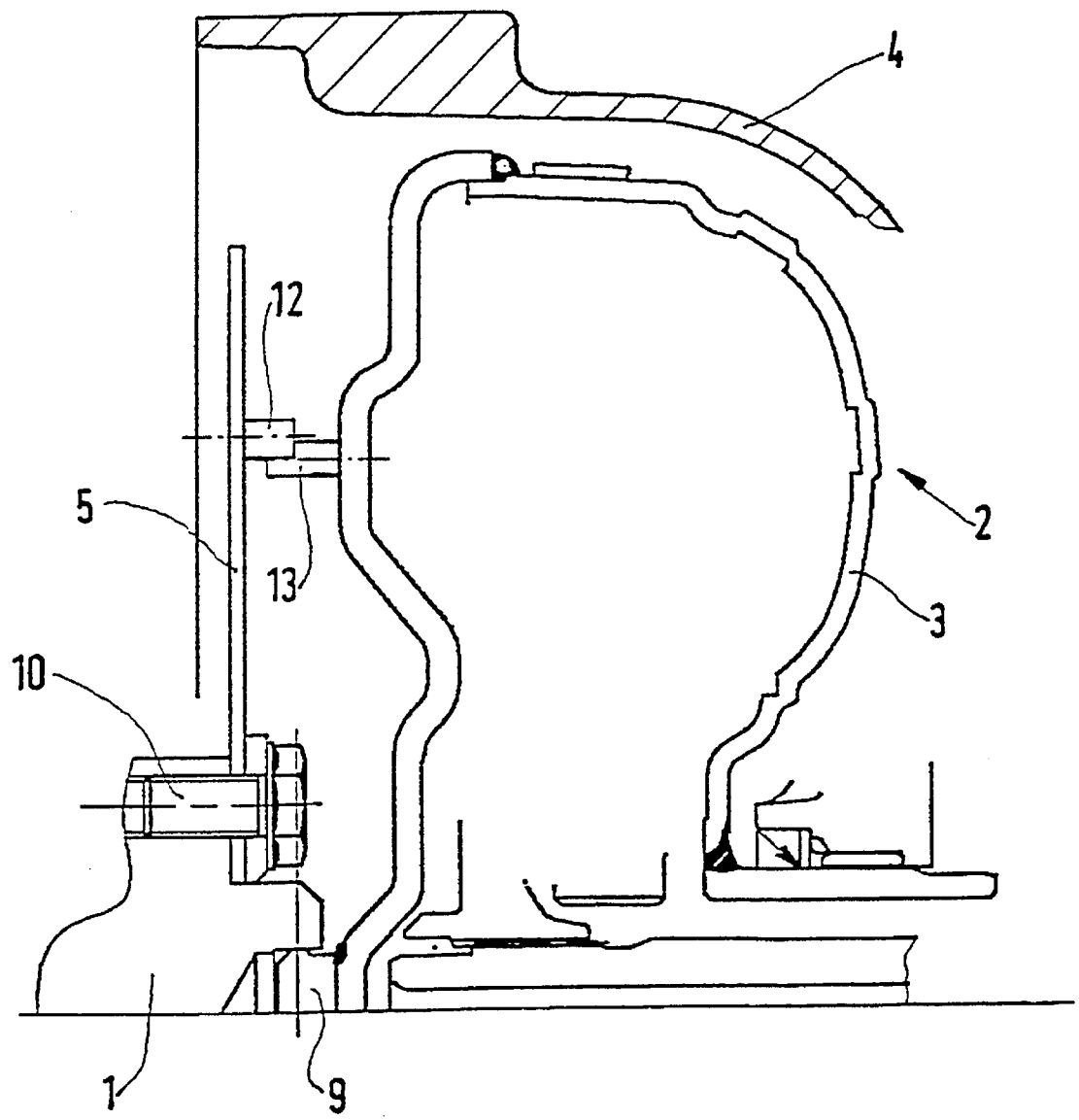

An embodiment of the invention is shown in the drawings. In the drawings:

FIG. 1 is a first embodiment of the device;
FIG. 2 is a top view of the first embodiment;
FIG. 3 is a second embodiment.

FIG. 1 shows a preferred embodiment of the invention for transmission of moment from a drive unit to a transmission using a hydrodynamic converter. With 1 is designated the output shaft of a drive unit, not shown, in an internal combustion engine, which is, for example, the crankshaft. With 2 is designated a hydrodynamic converter comprised of a converter housing 3 in which an impeller, turbine wheel and stator free wheel are integrated. The hydrodynamic converter 2 is in a transmission housing 4. Several intakes 7 are connected with the converter housing 3. A dog 5 is detachably connected with the output shaft 1 by means of a screw 10. The screw 10 fixes the dog 5 in an axial position relative to the output shaft 1. The dog 5 consists of two legs 5A and 5B which define a right angle. The dog 5, in the area of the right angle, has a recess 11. Said recess 11 can be seen in FIG. 2. The leg 5B is connected with the intake 7 by a connecting component 6. Connecting components, according to the invention, are to be understood as: screws, rivets, bolts or pins. One screw is shown. The moment transmission of the drive unit, not shown, to the impeller is as follows: output shaft 1, dog 5, intake 7, converter housing 3. The energy is transmitted from the impeller, not shown, to the turbine wheel, not shown, via a fluid medium such as oil. The turbine wheel converts the flowing movement to a rotary movement and drives a transmission input shaft 8. The hydrodynamic converter 2 has a pivot 9. Said pivot fixes the hydrodynamic converter 2 in a radial direction relative to the output shaft 1. The recess 11 of the dog 5 makes the dog 5 flexible in a radial direction so as to prevent double fixing in the radial direction by the pivot 9 and dog 5/intake 7. Hereby an increased loading of the bearings of the hydrodynamic converter 2, due to eccentric installation, is prevented.

In FIG. 2, the device of FIG. 1 is shown in a top view. The leg of the dog 5 is designated as 5B. The dog 5 has a recess 11 in the area of the right angle. The dog 5 and leg 5B are connected with the converter housing via a connecting component 6 and the intake 7, shown in dotted lines.

FIG. 3 shows another possible solution. The moment is transmitted here from the output shaft 1 via dog 5 to the converter housing 3 by a spline 12 and 13. The spline extends in an axial direction. Thereby the connection drive unit/hydrodynamic converter or transmission can be plugged in.

| Reference numerals | |
|---|---|
| 1 | output shaft driving unit |
| 2 | hydrodynamic converter |
| 3 | converter housing |
| 4 | transmission housing |
| 5 | dog |
| 5A | leg |

-continued

| Reference numerals | |
|---|---|
| 5B | leg |
| 6 | connecting component |
| 7 | intake |
| 8 | transmission input shaft |
| 9 | pivot |
| 10 | screw |
| 11 | recess |
| 12 | spline |
| 13 | spline |

I claim:

1. A device for transmission of moment from a drive unit to a transmission using a hydrodynamic converter (2) comprising a converter housing (3), an impeller, a turbine wheel and a stator free wheel, said impeller being connected with said converter housing (3) and a dog (5) being situated between said drive unit and said hydrodynamic converter which is fixed by several connecting components (6) in a reciprocal radial direction, said dog (5) comprises two legs (5A, 5B) which define a right angle and has a plurality of recesses (11), wherein a number of said connecting elements (6) is even so that changes of a shape of said dog as result of opposite connecting components, produced by internal structural stresses, compensate themselves, and said dog (5) has a recess (11) in the area of said right angle.

* * * * *